(12) United States Patent
Fujdala et al.

(10) Patent No.: US 8,258,070 B2
(45) Date of Patent: *Sep. 4, 2012

(54) ENGINE EXHAUST CATALYSTS CONTAINING PALLADIUM-GOLD

(75) Inventors: Kyle L. Fujdala, San Jose, CA (US); Timothy J. Truex, Oxnard, CA (US); Juan Cai, Sunnyvale, CA (US); Chaitanya Sampara, Mumbai (IN)

(73) Assignee: WGCH Technology Limited

( * ) Notice: Subject to any disclaimer, the term of this patent is extended or adjusted under 35 U.S.C. 154(b) by 375 days.

This patent is subject to a terminal disclaimer.

(21) Appl. No.: 12/615,135

(22) Filed: Nov. 9, 2009

(65) Prior Publication Data

US 2010/0048384 A1 Feb. 25, 2010

Related U.S. Application Data

(63) Continuation-in-part of application No. 12/436,028, filed on May 5, 2009, now Pat. No. 7,745,367, which is a continuation of application No. 11/942,710, filed on Nov. 20, 2007, now Pat. No. 7,534,738.

(60) Provisional application No. 60/867,335, filed on Nov. 27, 2006.

(51) Int. Cl.
*B01J 29/06* (2006.01)

(52) U.S. Cl. ............... 502/60; 502/63; 502/64; 502/66; 502/67; 502/69; 502/71; 502/74; 502/77; 502/79; 502/527.13; 502/527.18; 502/527.19

(58) Field of Classification Search ............... 502/60, 502/63, 64, 67, 69, 71, 74, 77, 79, 527.13, 502/527.18, 527.19, 66
See application file for complete search history.

(56) References Cited

U.S. PATENT DOCUMENTS

| | | |
|---|---|---|
| 3,929,965 A | 12/1975 | Kim et al. |
| 4,048,096 A | 9/1977 | Bissot |
| 4,053,434 A | 10/1977 | McArthur |
| 4,136,062 A | 1/1979 | Boudart et al. |
| 4,369,132 A | 1/1983 | Kinoshita et al. |
| 4,490,481 A | 12/1984 | Boitiaux et al. |
| 4,499,301 A | 2/1985 | Murib |
| 4,533,779 A | 8/1985 | Boitiaux et al. |
| 4,552,860 A | 11/1985 | Murib |
| 4,931,419 A | 6/1990 | Blanchard et al. |
| 5,185,308 A | 2/1993 | Bartley et al. |
| 5,194,417 A | 3/1993 | Smith et al. |
| 5,258,340 A | 11/1993 | Augustine et al. |
| 5,336,802 A | 8/1994 | Smith et al. |
| 5,665,668 A | 9/1997 | Grigorova et al. |
| 5,693,586 A | 12/1997 | Nicolau et al. |
| 5,700,753 A | 12/1997 | Wang et al. |
| 5,702,675 A | 12/1997 | Takeshima et al. |
| 5,848,356 A | 12/1998 | Jambhekar et al. |
| 5,849,256 A | 12/1998 | Deeba et al. |
| 5,894,068 A | 4/1999 | Kharas et al. |
| 5,911,961 A | 6/1999 | Horiuchi et al. |
| 5,948,377 A | 9/1999 | Sung |
| 5,977,012 A | 11/1999 | Kharas et al. |
| 5,989,507 A | 11/1999 | Sung et al. |
| 6,022,823 A | 2/2000 | Augustine et al. |
| 6,034,030 A | 3/2000 | Nicolau et al. |
| 6,087,298 A | 7/2000 | Sung et al. |
| 6,093,378 A | 7/2000 | Deeba et al. |
| 6,147,027 A | 11/2000 | Miyake et al. |
| 6,156,927 A | 12/2000 | Halcom et al. |
| 6,235,255 B1 | 5/2001 | Kharas |
| 6,420,308 B1 | 7/2002 | Khanmamedova |
| 6,656,873 B2 | 12/2003 | Chaturvedi et al. |
| 6,685,900 B2 | 2/2004 | Domesle et al. |
| 6,727,097 B2 | 4/2004 | Kumar et al. |
| 6,740,615 B2 | 5/2004 | Zhou |
| 6,763,309 B2 | 7/2004 | Kieken et al. |
| 6,777,571 B2 | 8/2004 | Chaturvedi et al. |
| 6,794,332 B2 | 9/2004 | Khanmamedova et al. |
| 6,821,501 B2 | 11/2004 | Matzakos et al. |
| 6,825,149 B2 | 11/2004 | Khanmamedova |
| 6,944,202 B2 | 9/2005 | Zuppero et al. |
| 7,169,735 B2 | 1/2007 | Sagae |
| 7,517,826 B2 * | 4/2009 | Fujdala et al. .................. 502/60 |
| 7,534,738 B2 * | 5/2009 | Fujdala et al. .................. 502/74 |
| 2001/0038812 A1 | 11/2001 | Yavuz et al. |
| 2001/0053340 A1 | 12/2001 | Noda et al. |
| 2003/0108465 A1 | 6/2003 | Voss et al. |
| 2004/0209761 A1* | 10/2004 | Yoshikawa .................... 502/66 |
| 2005/0169807 A1 | 8/2005 | Carpenter et al. |
| 2005/0197244 A1 | 9/2005 | L'vovich et al. |
| 2005/0261125 A1 | 11/2005 | Sagae |
| 2006/0088459 A1 | 4/2006 | Upchurch et al. |

FOREIGN PATENT DOCUMENTS

CN 1420260 5/2003

(Continued)

OTHER PUBLICATIONS

Beck, et al. "Genesis of Au-Pd Nanoparticles Supported on $SiO_2$: Structure and Catalytic Activity in CO Oxidation" North American Catalysis Society, Cancun Mexico XP002475084, Jun. 2, 2003, pp. 1-2.

(Continued)

*Primary Examiner* — Elizabeth Wood
(74) *Attorney, Agent, or Firm* — Patterson & Sheridan, LLP

(57) ABSTRACT

An emission control catalyst that exhibits improved CO and HC reduction performance includes supported precious group metal catalysts that are coated onto different layers of the substrate for the emission control catalyst. Zeolites of one or more types are added to the emission control catalyst as a hydrocarbon absorbing component to boost the low temperature performance of the emission control catalyst. Y zeolite is used by itself or mixed with other zeolites to enhance hydrocarbon storage at low temperatures.

21 Claims, 7 Drawing Sheets

FOREIGN PATENT DOCUMENTS

| | | |
|---|---|---|
| EP | 0 449 423 | 10/1991 |
| EP | 0 707 883 | 4/1996 |
| EP | 1 205 240 | 5/2002 |
| EP | 1570895 | 7/2005 |
| EP | 1 925 362 | 5/2007 |
| JP | 63240947 | 10/1988 |
| JP | 3-249948 | 11/1991 |
| JP | 8-103656 | 4/1996 |
| JP | 09299763 | 11/1997 |
| JP | 11-276907 | 10/1999 |
| JP | 2001-503321 | 3/2001 |
| JP | 2002-273174 | 9/2002 |
| JP | 2006-18772 | 1/2006 |
| WO | WO 97/00119 | 1/1997 |
| WO | WO 2005/030382 | 4/2005 |
| WO | WO 2007/007075 | 1/2007 |

OTHER PUBLICATIONS

Chinese Office Action for Application No. 200780050117.9 dated Apr. 26, 2011.
Chinese Office Action for Application No. 200910205664.0 dated May 11, 2011.
Japanese Office Action for Japanese Application No. 2009-546387 dated Feb. 14, 2012.
EP Search Report for Application No. 07869495.7-2104 / 2106291 PCT/US2007088085 dated Sep. 26, 2011.

* cited by examiner

ENGINE EXHAUST CATALYSTS CONTAINING PALLADIUM-GOLD

CROSS-REFERENCE TO RELATED APPLICATIONS

This application is a continuation-in-part of U.S. patent application Ser. No. 12/436,028, filed May 5, 2009, now U.S. Pat. No. 7,745,367, which is a continuation of U.S. patent application Ser. No. 11/942,710, filed Nov. 20, 2007 now U.S. Pat. No. 7,534,738, which claims the benefit of U.S. Provisional Patent Application Ser. No. 60/867,335, filed Nov. 27, 2006. U.S. patent application Ser. No. 12/436,028 is incorporated by reference herein.

BACKGROUND OF THE INVENTION

1. Field of the Invention

Embodiments of the present invention generally relate to supported catalysts containing precious group metals and, and more particularly, to engine exhaust catalysts containing palladium and gold, and methods of production thereof.

2. Description of the Related Art

Many industrial products such as fuels, lubricants, polymers, fibers, drugs, and other chemicals would not be manufacturable without the use of catalysts. Catalysts are also essential for the reduction of pollutants, particularly air pollutants created during the production of energy and by automobiles. Many industrial catalysts are composed of a high surface area support material upon which chemically active metal nanoparticles (i.e., nanometer sized metal particles) are dispersed. The support materials are generally inert, ceramic type materials having surface areas on the order of hundreds of square meters/gram. This high specific surface area usually requires a complex internal pore system. The metal nanoparticles are deposited on the support and dispersed throughout this internal pore system, and are generally between 1 and 100 nanometers in size.

Processes for making supported catalysts go back many years. One such process for making platinum catalysts, for example, involves the contacting of a support material such as alumina with a metal salt solution such as hexachloroplatinic acid in water. The metal salt solution "impregnates" or fills the pores of the support during this process. Following the impregnation, the support containing the metal salt solution would be dried, causing the metal salt to precipitate within the pores. The support containing the precipitated metal salt would then be calcined (typically in air) and, if necessary, exposed to a reducing gas environment (e.g., hydrogen or carbon monoxide) for further reduction to form metal particles. Another process for making supported catalysts involves the steps of contacting a support material with a metal salt solution and reducing the metal ions to metal particles in situ using suitable reducing agents.

Supported catalysts are quite useful in removing pollutants from vehicle exhausts. Vehicle exhausts contain harmful pollutants, such as carbon monoxide (CO), unburned hydrocarbons (HC), and nitrogen oxides (NOx), that contribute to the "smog-effect" that have plagued major metropolitan areas across the globe. Catalytic converters containing supported catalysts and particulate filters have been used to remove such harmful pollutants from the vehicle exhaust. While pollution from vehicle exhaust has decreased over the years from the use of catalytic converters and particulate filters, research into improved supported catalysts has been continuing as requirements for vehicle emission control have become more stringent and as vehicle manufacturers seek to use less amounts of precious metal in the supported catalysts to reduce the total cost of emission control.

The prior art teaches the use of supported catalysts containing palladium and gold as good partial oxidation catalysts. As such, they have been used extensively in the production of vinyl acetate in the vapor phase by reaction of ethylene, acetic acid and oxygen. See, e.g., U.S. Pat. No. 6,022,823. As for vehicle emission control applications, U.S. Pat. No. 6,763,309 speculates that palladium-gold might be a good bimetallic candidate for increasing the rate of NO decomposition. The disclosure, however, is based on a mathematical model and is not supported by experimental data. There is also no teaching in this patent that a palladium-gold system will be effective in treating vehicle emissions that include CO and HC.

SUMMARY OF THE INVENTION

The present invention provides emission control catalysts for treating emissions that include CO and HC, and methods for producing the same. The engine may be a vehicle engine, an industrial engine, or generally, any type of engine that burns hydrocarbons.

An emission control catalyst according to embodiments of the present invention exhibits improved CO and HC reduction performance. The emission control catalyst includes supported precious group metal catalysts that are coated onto different layers of the substrate for the emission control catalyst. Zeolites of one or more types are added to the emission control catalyst as a hydrocarbon absorbing component to boost the low temperature performance of the emission control catalyst. The zeolites absorb hydrocarbons in the exhaust gas and store them at the cold start stage when the catalyst temperature is relatively low. After the catalyst temperature rises up, both the stored hydrocarbons and other pollutants in the exhaust gas are converted. Y zeolite is used by itself or mixed with other zeolites in one or more embodiments of the invention to enhance hydrocarbon storage at low temperatures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Likewise, reference to "the invention" shall not be construed as a generalization of any inventive subject matter disclosed herein and shall not be considered to be an element or limitation of the appended claims except where explicitly recited in the claims.

FIGS. 1A-1D are schematic representations of different engine exhaust systems in which embodiments of the present invention may be used. The combustion process that occurs in an engine 102 produces harmful pollutants, such as CO, various hydrocarbons, particulate matter, and nitrogen oxides (NOx), in an exhaust stream that is discharged through a tail pipe 108 of the exhaust system.

Figure 1A:
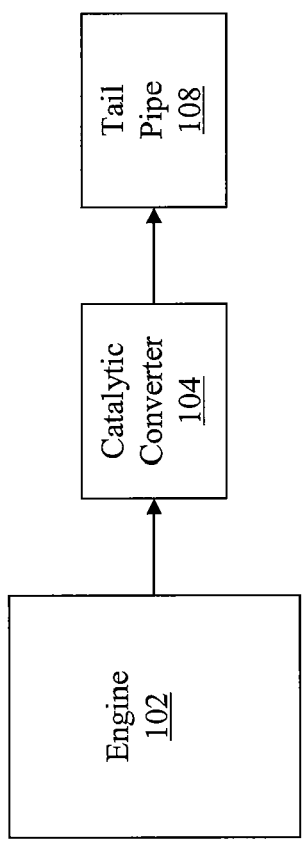
FIGS. 1A-1D are schematic representations of different engine exhaust systems in which embodiments of the present invention may be used.

In the exhaust system of FIG. 1A, the exhaust stream from an engine 102 passes through a catalytic converter 104, before it is discharged into the atmosphere (environment) through a tail pipe 108. The catalytic converter 104 contains supported catalysts coated on a monolithic substrate that treat the exhaust stream from the engine 102. The exhaust stream is treated by way of various catalytic reactions that occur within the catalytic converter 104. These reactions include the oxidation of CO to form $CO_2$, burning of hydrocarbons, and the conversion of NO to $NO_2$.

Figure 1B:
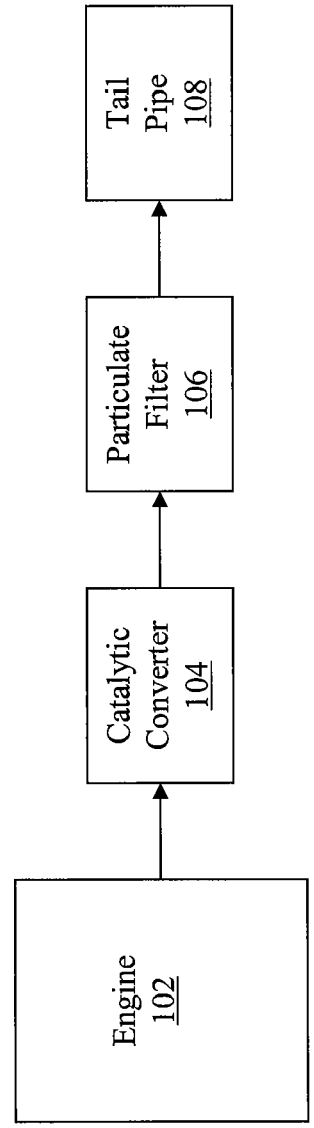

In the exhaust system of FIG. 1B, the exhaust stream from the engine 102 passes through a catalytic converter 104 and a particulate filter 106, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter.

Figure 1C:
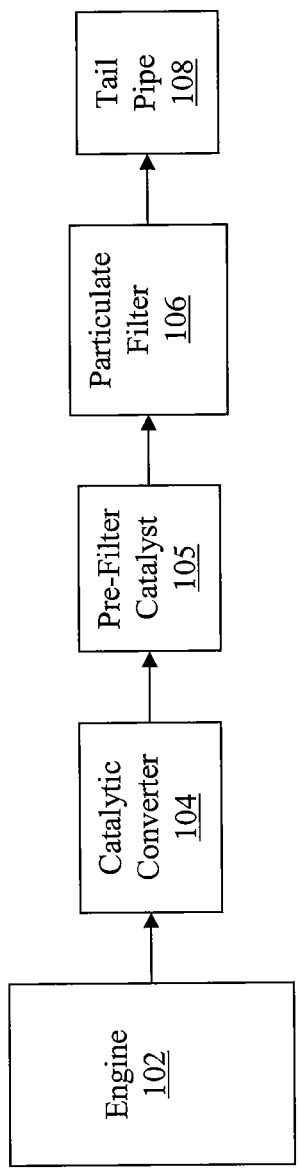

In the exhaust system of FIG. 1C, the exhaust stream from the engine 102 passes through a catalytic converter 104, a pre-filter catalyst 105 and a particulate filter 106, before it is discharged into the atmosphere through a tail pipe 108. The catalytic converter 104 operates in the same manner as in the exhaust system of FIG. 1A. The pre-filter catalyst 105 includes a monolithic substrate and supported catalysts coated on the monolithic substrate for the oxidation of NO. The particulate filter 106 traps particulate matter that is in the exhaust stream, e.g., soot, liquid hydrocarbons, generally particulates in liquid form.

Figure 1D:
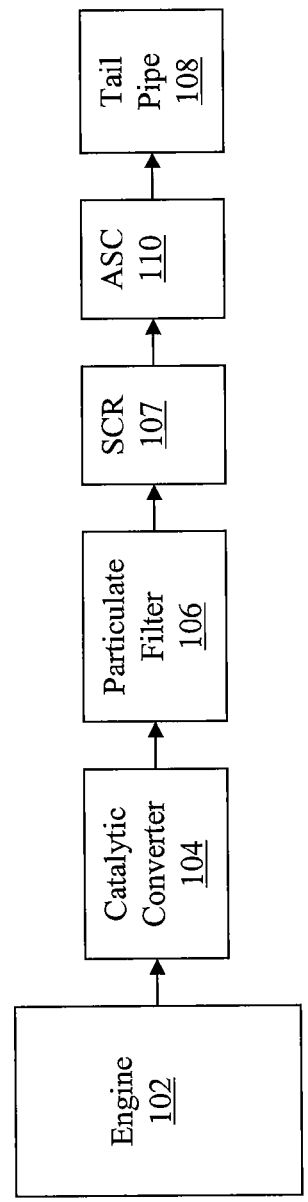

In the exhaust system of FIG. 1D, the exhaust stream passes from the engine 102 through a catalytic converter 104, a particulate filter 106, a selective catalytic reduction (SCR) unit 107 and an ammonia slip catalyst 110, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter. The SCR unit 107 is provided to reduce the NOx species to $N_2$. The SCR unit 107 may be ammonia/urea based or hydrocarbon based. The ammonia slip catalyst 110 is provided to reduce the amount of ammonia emissions through the tail pipe 108. An alternative configuration places the SCR unit 107 in front of the particulate filter 106.

Alternative configurations of the exhaust system includes the provision of SCR unit 107 and the ammonia slip catalyst 110 in the exhaust system of FIG. 1A or 1C, and the provision of just the SCR unit 107, without the ammonia slip catalyst 110, in the exhaust system of FIG. 1A, 1B or 1C.

As particulates get trapped in the particulate filter within the exhaust system of FIG. 1B, 1C or 1D, it becomes less effective and regeneration of the particulate filter becomes necessary. The regeneration of the particulate filter can be either passive or active. Passive regeneration occurs automatically in the presence of $NO_2$. Thus, as the exhaust stream containing $NO_2$ passes through the particulate filter, passive regeneration occurs. During regeneration, the particulates get oxidized and $NO_2$ gets converted back to NO. In general, higher amounts of $NO_2$ improve the regeneration performance, and thus this process is commonly referred to as $NO_2$ assisted oxidation. However, too much $NO_2$ is not desirable because excess $NO_2$ is released into the atmosphere and $NO_2$ is considered to be a more harmful pollutant than NO. The $NO_2$ used for regeneration can be formed in the engine during combustion, from NO oxidation in the catalytic converter 104, from NO oxidation in the pre-filter catalyst 105, and/or from NO oxidation in a catalyzed version of the particulate filter 106.

Active regeneration is carried out by heating up the particulate filter 106 and oxidizing the particulates. At higher temperatures, $NO_2$ assistance of the particulate oxidation becomes less important. The heating of the particulate filter 106 may be carried out in various ways known in the art. One way is to employ a fuel burner which heats the particulate filter 106 to particulate combustion temperatures. Another way is to increase the temperature of the exhaust stream by modifying the engine output when the particulate filter load reaches a pre-determined level.

The present invention provides catalysts that are to be used in the catalytic converter 104 shown in FIGS. 1A-1D, or generally as catalysts in any vehicle emission control system, including as a diesel oxidation catalyst, a diesel filter catalyst, an ammonia-slip catalyst, an SCR catalyst, or as a component of a three-way catalyst. The present invention further provides a vehicle emission control system, such as the ones shown in FIGS. 1A-1D, comprising an emission control catalyst comprising a monolith and a supported catalyst coated on the monolith.

Figure 2:
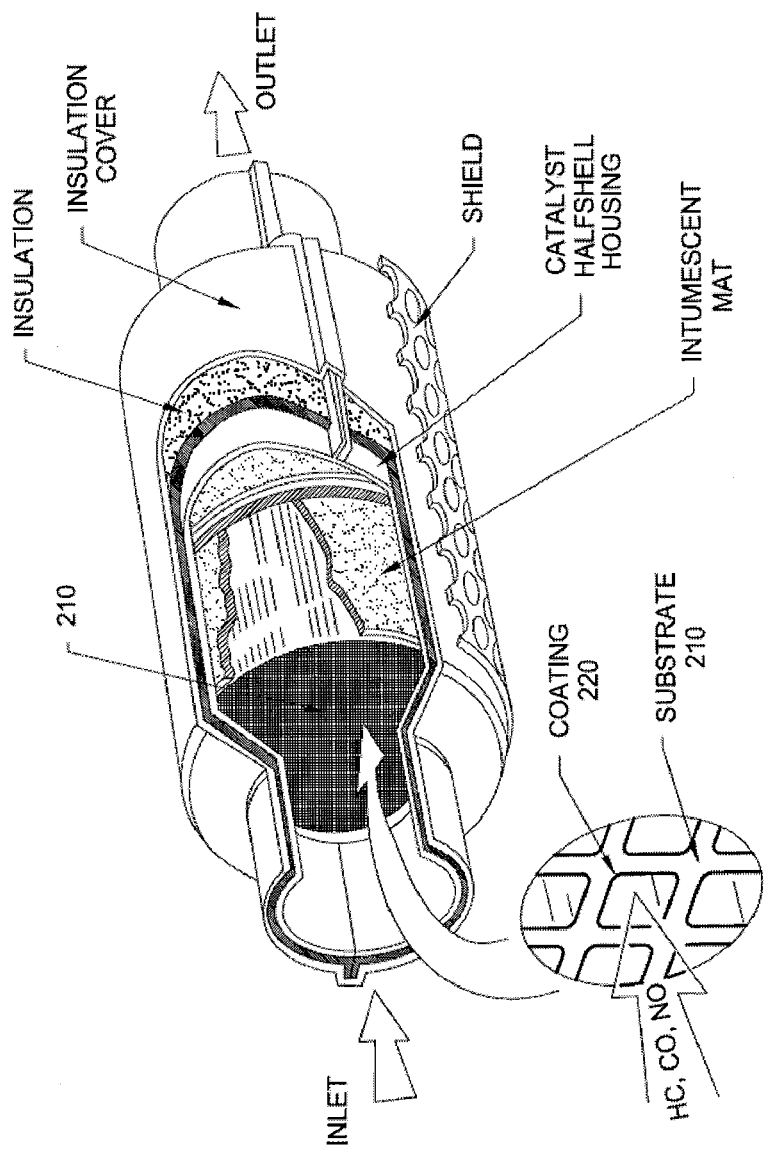
FIG. 2 is an illustration of a catalytic converter with a cut-away section that shows a substrate onto which emission control catalysts according to embodiments of the present invention are coated.

FIG. 2 is an illustration of a catalytic converter with a cut-away section that shows a substrate 210 onto which supported metal catalysts are coated. The exploded view of the substrate 210 shows that the substrate 210 has a honeycomb structure comprising a plurality of channels into which washcoats containing supported metal catalysts are flowed in slurry form so as to form coating 220 on the substrate 210.

Figure 3B:
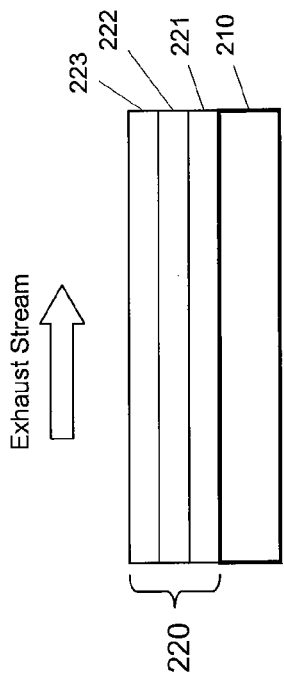
FIGS. 3A-3D illustrate different configurations of a substrate for an emission control catalyst.
Figure 3D:
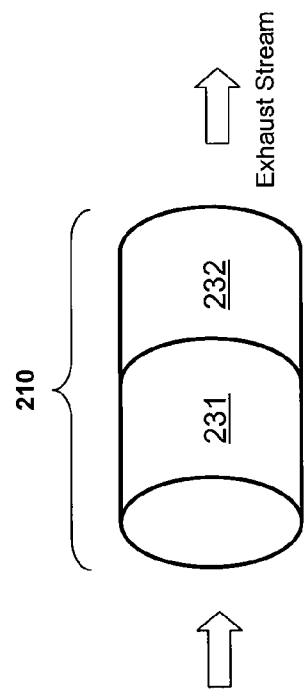
Figure 3A:
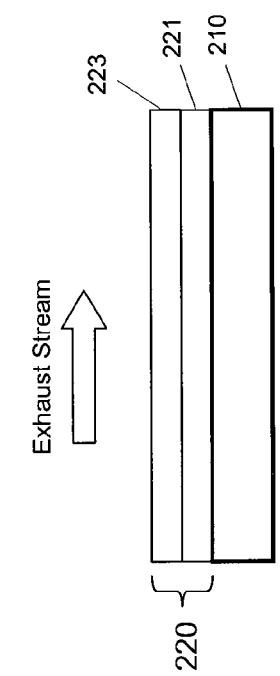

FIGS. 3A-3D illustrate different embodiments of the present invention. In the embodiment of FIG. 3A, coating 220 comprises two washcoat layers 221, 223 on top of substrate 210. Washcoat layer 221 is the bottom layer that is disposed directly on top of the substrate 210 and contains metal particles having palladium and gold in close contact (also referred to as "palladium-gold metal particles"). Washcoat layer 223 is the top layer that is in direct contact with the exhaust stream and contains metal particles having platinum alone or in close contact with another metal species such as palladium (also referred to as "platinum-containing metal particles"). Based on their positions relative to the exhaust stream, washcoat layer 223 encounters the exhaust stream before washcoat layer 221.

In the embodiment of FIG. 3B, coating 220 comprises three washcoat layers 221, 222, 223 on top of substrate 210. Washcoat layer 221 is the bottom layer that is disposed directly on top of the substrate 210 and includes palladium-gold metal particles. Washcoat layer 223 is the top layer that is in direct contact with the exhaust stream and includes platinum-containing metal particles. Washcoat layer 222 is the middle layer that is disposed in between washcoat layers 221, 223. The middle layer is provided to minimize the interaction between the Pt and Pd—Au components. The middle layer may be a blank support or may contain zeolites, rare-earth oxides, or inorganic oxides. Based on their positions relative to the exhaust stream, washcoat layer 223 encounters the exhaust stream before washcoat layers 221, 222, and washcoat layer 222 encounters the exhaust stream before washcoat layer 221.

Figure 3C:
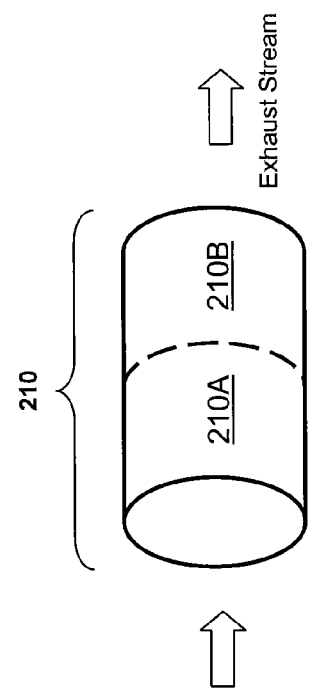

In the embodiment of FIG. 3C, the substrate 210 is a single monolith that has two coating zones 210A, 210B. A washcoat including platinum-containing metal particles is coated onto a first zone 210A and a washcoat including palladium-gold metal particles is coated onto a second zone 210B.

In the embodiment of FIG. 3D, the substrate 210 includes first and second monoliths 231, 232, which are physically separate monoliths. A washcoat including platinum-containing metal particles is coated onto the first monolith 231 and a washcoat including palladium-gold metal particles is coated onto the second monolith 232.

All of the embodiments described above include a palladium-gold catalyst in combination with a platinum-based catalyst. The weight ratio of palladium to gold in the palladium-gold catalyst is about 0.05:1 to 20:1, preferably from about 0.5:1 to about 2:1. The palladium-gold catalyst may be promoted with bismuth or other known promoters. The platinum-based catalyst may be a platinum catalyst, a platinum-palladium catalyst, a platinum catalyst promoted with bismuth or other now promoters, or other platinum-based catalysts (e.g., Pt—Rh, Pt—Ir, Pt—Ru, Pt—Au, Pt—Ag, Pt—Rh—Ir, Pt—Ir—Au, etc.). The preferred embodiments employ a platinum-palladium catalyst as the platinum-based catalyst. The weight ratio of platinum to palladium in this catalyst is about 0.05:1 to 20:1, preferably from about 2:1 to about 4:1.

In addition, the platinum-based catalyst is situated so that it encounters the exhaust stream prior to the palladium-gold catalyst. By positioning the platinum-based catalyst relative to the palladium-gold catalyst in this manner, the inventors have discovered that HC inhibition effects on the oxidation activity of the palladium-gold catalyst are reduced to sufficient levels so that the overall catalytic performance is improved. In the embodiments of FIGS. 3A and 3B, the platinum-based catalyst is included in the top layer 223 and the palladium-gold catalyst is included in the bottom layer 221. In the embodiment of FIG. 3C, the platinum-based catalyst is included in the first zone 210A and the palladium-gold catalyst is included in the second zone 210B. In the embodiment of FIG. 3D, the platinum-based catalyst is included in the first monolith 231 and the palladium-gold catalyst is included in the second monolith 232.

In additional embodiments of the present invention, a hydrocarbon absorbing material is added to the emission control catalyst. Preferably, the hydrocarbon absorbing material is added to the emission control catalyst so that it encounters exhaust stream prior to the palladium-gold catalyst. By positioning the hydrocarbon absorbing material relative to the palladium-gold catalyst in this manner, the inventors have discovered that HC inhibition effects on the oxidation activity of the palladium-gold catalyst are reduced to sufficient levels so that the overall catalytic performance is improved. In the configuration shown in FIG. 3A, the hydrocarbon absorbing material may be included in the top layer 223. In the configuration shown in FIG. 3B, the hydrocarbon absorbing material may be included in the middle layer 222 or the top layer 223. In the configuration shown in FIG. 3C, the hydrocarbon absorbing material may be included in the first zone 210A. In the configuration shown in FIG. 3D, the hydrocarbon absorbing material may be included in the front monolith 231.

In other embodiments of the present invention, any of the washcoat layers or zones, or monoliths may include rare-earth oxides, such as cerium(IV) oxide ($CeO_2$) and ceria-zirconia ($CeO_2$—$ZrO_2$).

Figure 4:
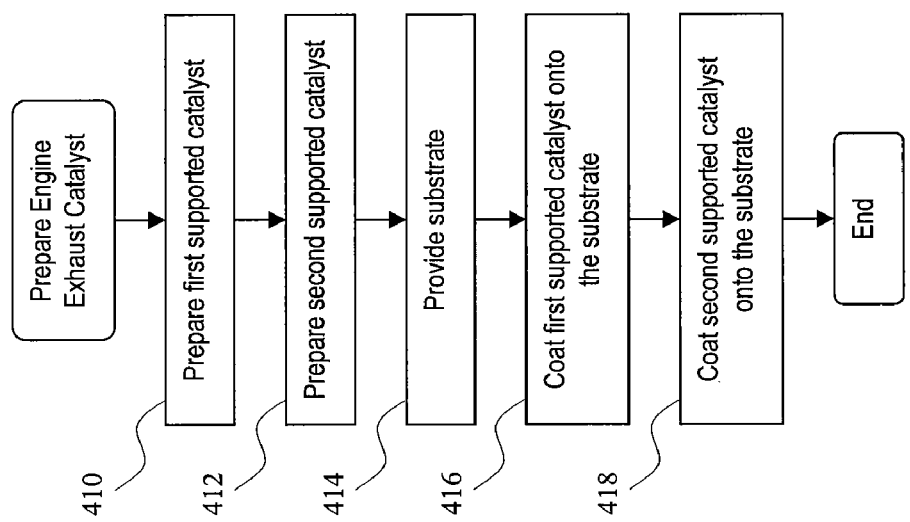
FIG. 4 is a flow diagram illustrating the steps for preparing an emission control catalyst according to an embodiment of the present invention.

FIG. 4 is a flow diagram that illustrates the steps for preparing an emission control catalyst according to an embodiment of the present invention using the substrate 210. In step 410, a first supported catalyst, e.g., supported palladium-gold catalyst, is prepared is accordance with known methods or with the methods described in the examples provided below. In step 412, a second supported catalyst, e.g., supported platinum-based catalyst, is prepared in accordance with known methods or with the methods described in the examples provided below. A monolithic substrate, such as substrate 210 shown in FIG. 2 (or monolithic substrates 231, 232 shown in FIG. 3D) is provided in step 414. Exemplary monolithic substrates include those that are ceramic (e.g., cordierite), metallic, or silicon carbide based. In step 416, the first supported catalyst in powder form are mixed in a solvent to form a washcoat slurry, and the washcoat slurry is coated as the bottom layer of the substrate 210 or onto a rear zone or rear monolith of the substrate 210. In step 418, the second supported catalyst in powder form are mixed in a solvent to form a washcoat slurry, and the washcoat slurry is coated as the top layer of the substrate 210 or onto a front zone or front monolith of the substrate 210. Optionally, zeolite or zeolite mixture including one or more of beta zeolite, ZSM-5 zeolite, and other types of zeolites is added to the washcoat slurry before the washcoat slurry is coated in step 418.

Figure 5:
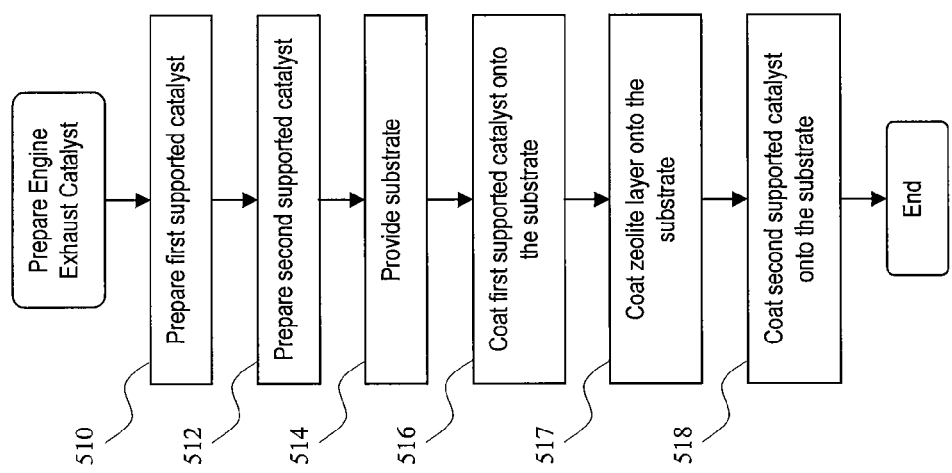
FIG. 5 is a flow diagram illustrating the steps for preparing an emission control catalyst according to another embodiment of the present invention.

FIG. 5 is a flow diagram that illustrates the steps for preparing an emission control catalyst according to another embodiment of the present invention using the substrate 210. In step 510, a first supported catalyst, e.g., supported palladium-gold catalyst, is prepared is accordance with known methods or with the methods described in the examples provided below. In step 512, a second supported catalyst, e.g., supported platinum-based catalyst, is prepared in accordance with known methods or with the methods described in the examples provided below. A monolithic substrate, such as substrate 210 shown in FIG. 2, is provided in step 514. Exemplary monolithic substrates include those that are ceramic (e.g., cordierite), metallic, or silicon carbide based. In step 516, the first supported catalyst in powder form are mixed in a solvent to form a washcoat slurry, and the washcoat slurry is coated as the bottom layer of the substrate 210. In step 517, zeolite or zeolite mixture is added to a solvent to form a washcoat slurry and this washcoat slurry is coated as the middle layer of the substrate 210. In step 518, the second supported catalyst in powder form are mixed in a solvent to form a washcoat slurry, and the washcoat slurry is coated as the top layer of the substrate 210.

In the examples provided below, zeolite is employed as a hydrocarbon absorbing material in the middle layer of a three-layered system shown in FIG. 3B. Zeolite is crystalline aluminosilicate. There are more than 150 types of structures of zeolite, and each structure consists of well defined pores with size in the range of 0.3 nm to 2.0 nm. In principle, only gas molecules with sizes smaller than the pores can be absorbed and stored in zeolites. The largest amount of hydrocarbon is absorbed when the pore size of zeolite is similar to the size of the hydrocarbon molecules.

The Si:Al ratio of the zeolite is another factor that influences the hydrocarbon storage effect. Zeolites with high Si:Al ratio can typically store more hydrocarbons and have better thermal stability. Therefore, zeolites with a high Si:Al ratio, e.g., greater than 5, are preferred. Zeolites with a Si:Al ratio of greater than 20 are even more preferred.

Zeolites used in one or more embodiments of the invention may be a beta zeolite, ZSM-5 zeolite, Y zeolite, SSZ-33 zeolite, mordenite, and combinations of the foregoing in any weight ratio. Because the hydrocarbon components in a vehicle exhaust are made up of small and big molecules, combinations of zeolites with different pore sizes are employed to enhance the hydrocarbon storage effect.

CO/propene/xylene will be converted (i.e., oxidized or burned). Generally, higher conversion is observed at higher temperatures and lower conversion is observed at lower temperatures.

The T20, T50 and T70 temperatures of catalysts differ depending on the conditions under which the conversion is observed. Therefore, they are determined under conditions that simulate the actual operating conditions of the catalyst as closely as possible. Examples 1-3 are useful as diesel exhaust catalysts, and thus their T20, T50, T70 temperatures have been determined under simulated diesel exhaust conditions, which were as follows. A gas mixture having the composition: CO (1000 ppm), $CO_2$ (10%), $O_2$ (20%), $H_2O$ (2%), $C_3H_6$ (230 ppm), $C_3H_8$ (110 ppm), xylene (120 ppm), NO (150 ppm), and He (balance), is supplied into a fixed bed flow reactor containing the example catalysts at a total flow rate of 3240 ml/min. The reactor is heated from 40° C. to 450° C. at 10° C./minute. As the reactor is heated, CO/propene/xylene conversion was measured by use of mass spectrometry as a function of temperature. The T20, T50 and T70 temperatures of Examples 1-3 for converting CO, propene and xylene are provided below in Table 2. As shown in Table 2, Examples 1 and 2 convert each of CO, propene and xylene at lower temperatures than Example 3. It is expected that the presence of Y zeolite in Examples 1 and 2 helps with the improved conversion efficiency of these catalysts.

TABLE 2

| Catalyst | CO | | | Propene | | | Xylene | | |
|---|---|---|---|---|---|---|---|---|---|
| | T20 (° C.) | T50 (° C.) | T70 (° C.) | T20 (° C.) | T50 (° C.) | T70 (° C.) | T20 (° C.) | T50 (° C.) | T70 (° C.) |
| Example 1 | 156 | 171 | 176 | 179 | 187 | 190 | 180 | 186 | 189 |
| Example 2 | 146 | 160 | 167 | 171 | 179 | 184 | 172 | 179 | 185 |
| Example 3 (comparative) | 163 | 178 | 183 | 190 | 196 | 198 | 189 | 193 | 197 |

Y zeolite is employed in the middle layer of Examples 1 and 2 and the CO and hydrocarbon conversion performance of these Examples is compared against CO and hydrocarbon (in particular propene and xylene) conversion performance of a comparable catalyst with the same amount of zeolite loading but without Y zeolite (Example 3). The composition of Examples 1-3 is provided below in Table 1.

TABLE 1

| Catalyst | Top Layer | Middle Layer | | | Bottom Layer |
|---|---|---|---|---|---|
| | | ZSM-5 (g/in³) | beta (g/in³) | Y (g/in³) | |
| Example 1 | Pt:Pd wt ratio is 3.0:1.5 total loading = 0.8 g/in³ | 0.1 | 0 | 0.2 | Pd:Au wt ratio is 1.7:2.0 total loading = 1.5 g/in³ |
| Example 2 | | 0 | 0 | 0.3 | |
| Example 3 (comparative) | | 0.15 | 0.15 | 0 | |

The CO/propene/xylene conversion performance of Examples 1-3 is compared by measuring the T20, T50, and T70 temperatures. The T20/T50/T70 temperatures correspond to the temperatures at which 20%/50%/70% of The hydrocarbon storage capacity of each of Examples 1-3 has also been measured using TPD (temperature programmed desorption) experiments and compared. The procedure for the experiment was as follows: (1) Flow helium through example catalyst (i.e., one of Examples 1-3). (2) Expose example catalyst to specific adsorbate gases at room temperature (30° C.) for some time until all possible adsorption sites are saturated with hydrocarbons. (3) Flow helium through example catalyst at room temperature to remove the physisorbed hydrocarbons. (4) Flow helium through example catalyst and ramp up the temperature to 450° C. (5) Cool down example catalyst. The following data were monitored using a mass spectrometer: the total adsorption amount (Atot), the desorption amount at room temperature (Drt), and desorption amount at high temperature (T>150° C.) (Dht). In general, it is desirable to have high Atot, high Dht, and low Drt. The monitored data for each of xylene and decane are tabulated below in Table 3. As shown, Examples 1 and 2 perform better overall in storing xylene and decane than Example 3. Again, it is expected that the presence of Y zeolite in Examples 1 and 2 helps with the improved hydrocarbon storage capacity.

TABLE 3

| Catalyst | Xylene | | | Decane | | |
|---|---|---|---|---|---|---|
| | Atot (mol/g) | Drt (mol/g) | Dht (mol/g) | Atot (mol/g) | Drt (mol/g) | Dht (mol/g) |
| Example 1 | 1.68e−04 | 7.85e−05 | 4.28e−06 | 1.26e−04 | 5.48e−05 | 2.67e−05 |
| Example 2 | 2.07e−04 | 7.19e−05 | 1.65e−05 | 1.50e−04 | 5.80e−05 | 4.82e−05 |
| Example 3 (comparative) | 5.42e−05 | 3.79e−05 | 1.45e−06 | 7.92e−05 | 4.78e−05 | 9.42e−06 |

Figure 6:
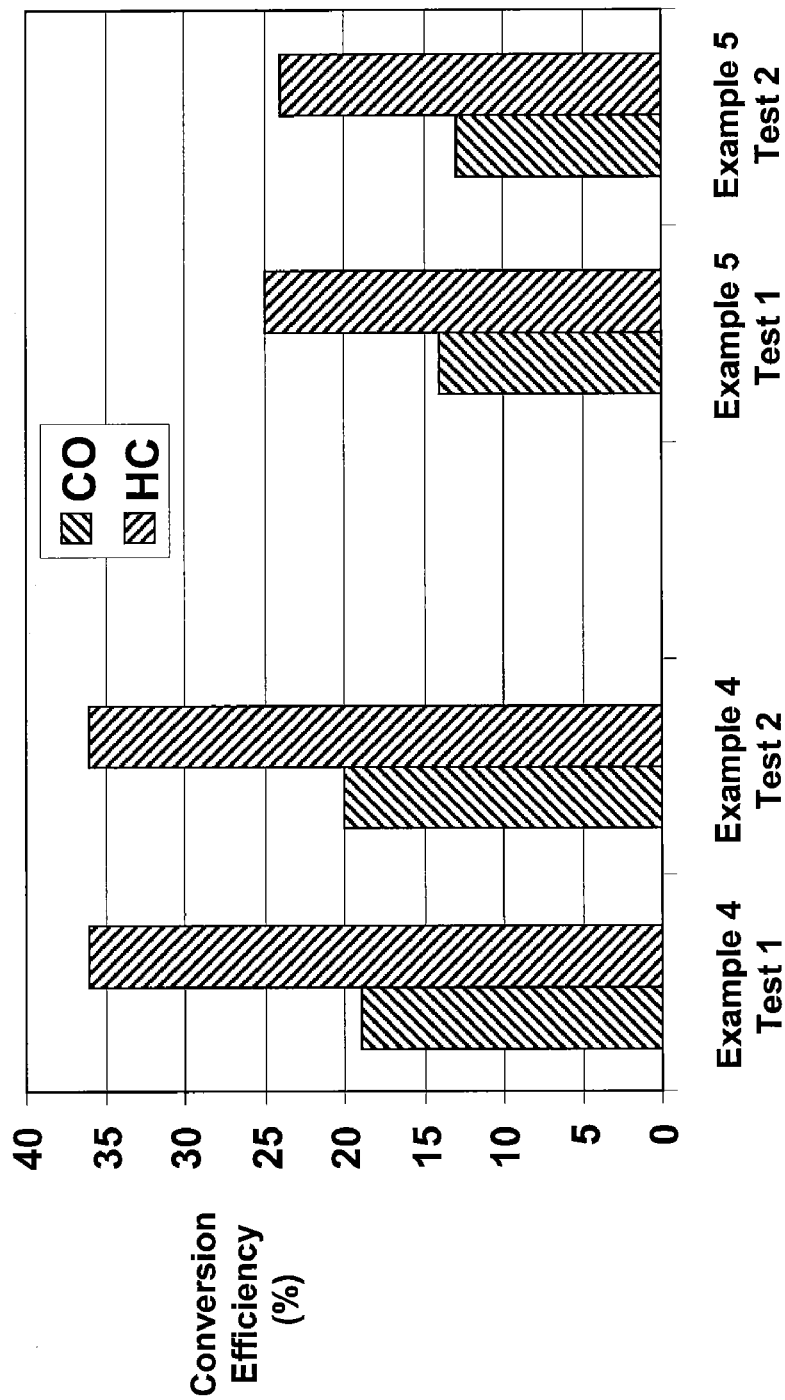
FIG. 6 is a bar graph illustrating the improved conversion efficiency of an emission control catalyst according to an embodiment of the present invention.

Vehicle tests were carried out to observe the effect of Y zeolite on CO and hydrocarbon conversion efficiency. The formulation of the catalyst containing Y zeolite (Example 4) and the catalyst containing ZSM-5 zeolite and beta zeolite (Example 5) is shown in Table 4. Prior to vehicle testing, Examples 4 and 5 were hydrothermally aged at 840° C. for 10 hours. Two vehicle tests were carried out on each example catalyst. The CO and HC conversion efficiency of Examples 4 and 5 during the vehicles tests is shown in FIG. 6. It can be seen from FIG. 6 that Example 4 performs better than Example 5.

TABLE 4

| Catalyst | Top Layer | Middle Layer | | | Bottom Layer |
|---|---|---|---|---|---|
| | | ZSM-5 (g/in$^3$) | beta (g/in$^3$) | Y (g/in$^3$) | |
| Example 4 | Pt:Pd wt ratio is 4.0:2.0 total loading = 0.9 g/in$^3$ | 0.15 | 0.15 | 0.15 | Pd:Au wt ratio is 3.0:3.6 total loading = 1.0 g/in$^3$ |
| Example 5 (comparative) | | 0.15 | 0.15 | 0 | |

The preparation methods for Examples 1-5 were as follows:

Preparation of a 1.7% Pd, 2.0% Au Supported PdAu Catalyst.

Lanthanum-stabilized alumina (578 g, having a surface area of ~200 m$^2$/g) and 2940 mL of de-ionized water (>18 MΩ) were added to a 5 L plastic beaker and magnetically stirred at about 500 rpm. The pH measured was 8.5 and the temperature measured was 25° C. After 20 minutes, Pd(NO$_3$)$_2$ (67.8 g of 14.8% aqueous solution) was gradually added over a period of 10 min. The pH measured was 4.3. After stirring for 20 minutes, a second metal, HAuCl$_4$.3H$_2$O (24 g dissolved in 50 mL of de-ionized water), was added over a period of 5 min. The pH was 4.0 and the temperature of the metal-support slurry was 25° C. The metal-support slurry was stirred for an additional 30 min. In a second vessel, NaBH$_4$ (29.4 g) and NaOH (31.1 g) were added to N$_2$H$_4$ (142 mL of 35% aqueous solution) and stirred until the mixture became clear. This mixture constituted the reducing agent mixture. The metal-support slurry and reducing agent mixture were combined continuously using two peristaltic pumps. The two streams were combined using a Y joint connected to a Vigreux column to cause turbulent mixing. The reaction product leaving the mixing chamber, i.e., the Vigreux column, was pumped into an intermediate vessel of smaller volume and continuously stirred. The product in the intermediate vessel was continuously pumped into a larger vessel, i.e., 5 L beaker, for residence and with continued stirring. The entire addition/mixing process lasted about 30 min. The resulting product slurry was stirred in the larger vessel for an additional period of 1 hour. The final pH was 11.0 and the temperature was 25° C. The product slurry was then filtered using vacuum techniques via Buchner funnels provided with a double layer of filter paper having 3 μm porosity. The filter cake was then washed with about 20 L of de-ionized water in several approximately equal portions. Thereafter, the washed cake was dried at 110° C., ground to a fine powder using a mortar and pestle, and subsequently calcined at 500° C. for 2 hours, with a heating rate of 8° C./min. This supported PdAu catalyst powder (1.7% Pd, 2.0% Au) was used in preparing Examples 1-3.

Preparation of a 3.0% Pd, 3.6% Au Supported PdAu Catalyst.

Lanthanum-stabilized alumina (600 g, having a surface area of ~200 m$^2$/g) and 3051 mL of de-ionized water (>18 MΩ) were added to a 5 L plastic beaker and magnetically stirred at about 500 rpm. The pH measured was 8.5 and the temperature measured was 25° C. After 20 minutes, Pd(NO$_3$)$_2$ (130.2 g of 14.8% aqueous solution) was gradually added over a period of 10 min. The pH measured was 4.3. After stirring for 20 minutes, a second metal, HAuCl$_4$.3H$_2$O (46.2 g dissolved in 90 mL of de-ionized water), was added over a period of 5 min. The pH was 4.0 and the temperature of the metal-support slurry was 25° C. The metal-support slurry was stirred for an additional 30 min. In a second vessel, NaBH4 (56.7 g) and NaOH (59.6 g) were added to N$_2$H$_4$ (273 mL of 35% aqueous solution) and stirred until the mixture became clear. This mixture constituted the reducing agent mixture. The metal-support slurry and reducing agent mixture were combined continuously using two peristaltic pumps. The two streams were combined using a Y joint connected to a Vigreux column to cause turbulent mixing. The reaction product leaving the mixing chamber, i.e., the Vigreux column, was pumped into an intermediate vessel of smaller volume and continuously stirred. The product in the intermediate vessel was continuously pumped into a larger vessel, i.e., 5 L beaker, for residence and with continued stirring. The entire addition/mixing process lasted about 30 min. The resulting product slurry was stirred in the larger vessel for an additional period of 1 hour. The final pH was 11.0 and the temperature was 25° C. The product slurry was then filtered using vacuum techniques via Buchner funnels provided with a double layer of filter paper having 3 μm porosity. The filter cake was then washed with about 20 L of de-ionized water in several approximately equal portions. Thereafter, the washed cake was dried at 110° C., ground to a fine powder using a mortar and pestle, and subsequently calcined at 500° C. for 2 hours, with a heating rate of 8° C./min. This supported PdAu catalyst powder (3.0% Pd, 3.6% Au) was used in preparing Examples 4 and 5.

Preparation of a 3.0% Pt, 1.5% Pd Supported Catalyst.

To 10 L of de-ionized H$_2$O was added 1940 g of La-stabilized alumina (having a BET surface area of ~200 m$^2$/g) followed by stirring for 30 minutes at room temperature. To this slurry was added 490.6 g of Pt(NO$_3$)$_2$ solution (12.23% Pt(NO$_3$)$_2$ by weight), followed by stirring at room temperature for 60 minutes. Acrylic acid (750 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C./min) to give a 3% Pt material.

To 9.25 L of de-ionized $H_2O$ was added 1822 g of the above 3% Pt material followed by stirring for 20 minutes at room temperature. To this slurry was added 194.4 g of $Pd(NO_3)_2$ solution (14.28% $Pd(NO_3)_2$ by weight), followed by stirring at room temperature for 60 minutes. An aqueous ascorbic acid solution (930 g in 4.5 L of de-ionized $H_2O$) was then added over 25 minutes followed by stirring for 60 minutes. The solid La-doped alumina supported PtPd catalyst was separated from the liquid via filtration, dried at 120° C. for 2 hours, ground into a fine powder, and calcined in air for 2 hours at a temperature of 500° C. (heated at 8° C./min) to give a 3% Pt, 1.5% Pd material. This material was used in preparing Examples 1-3.

Preparation of a 4.0% Pt, 2.0% Pd Supported Catalyst.

To 10 L of de-ionized $H_2O$ was added 2000 g of La-stabilized alumina (having a BET surface area of ~200 $m^2/g$) followed by stirring for 30 minutes at room temperature. To this slurry was added 695.9 g of $Pt(NO_3)_2$ solution (12.23% $Pt(NO_3)_2$ by weight), followed by stirring at room temperature for 60 minutes. Acrylic acid (1047 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C./min) to give a 4% Pt material.

To 9.25 L of de-ionized $H_2O$ was added 1822 g of the above 4% Pt material followed by stirring for 20 minutes at room temperature. To this slurry was added 260.4 g of $Pd(NO_3)_2$ solution (14.28% $Pd(NO_3)_2$ by weight), followed by stirring at room temperature for 60 minutes. An aqueous ascorbic acid solution (1230 g in 4.5 L of de-ionized $H_2O$) was then added over 25 minutes followed by stirring for 60 minutes. The solid La-doped alumina supported PtPd catalyst was separated from the liquid via filtration, dried at 120° C. for 2 hours, ground into a fine powder, and calcined in air for 2 hours at a temperature of 500° C. (heated at 8° C./min). This supported PtPd catalyst powder (4.0% Pt, 2.0% Pd) was used in preparing Examples 4 and 5.

EXAMPLE 1

PdAu (at 1.5 $g/in^3$) 1st Layer, Zeolite Mixture (ZSM/Y=0.1/0.2 $g/in^3$) 2nd Layer, PtPd (at 0.8 $g/in^3$) 3rd Layer.

The supported PdAu catalyst powder (1.7% Pd, 2.0% Au) prepared as described above was made into a washcoat slurry via addition to de-ionized water, milling to an appropriate particle size (typically with a d50 range from 3 to 7 μm), and pH adjustment to give an appropriate viscosity for washcoating. According to methods known in the art, the washcoat slurry was coated onto a round cordierite monolith (Corning, 400 cpsi, 54.63 $in^3$), dried at 120° C. and calcined at 500° C. to give the first layer of the multi-layer coated monolith, such that the PdAu loading was ~1.5 $g/in^3$.

Then, ZSM-5 zeolite and Y zeolite with a weight ratio of 1:2 were combined and made into a washcoat slurry via addition to de-ionized water, milling to an appropriate particle size (typically with a d50 range from 3 to 7 μm), and pH adjustment to give an appropriate viscosity for washcoating. According to methods known in the art, the zeolite washcoat slurry was coated onto the cordierite monolith (with the first layer of PtPd), dried at 120° C. and calcined at 500° C. to give the second layer of the multi-layer coated monolith. The ZSM-5 and Y zeolite washcoat loading are 0.1 $g/in^3$ and 0.2 $g/in^3$, respectively.

Then, the supported PtPd catalyst powder (3.0% Pt, 1.5% Pd) prepared as described above was made into a washcoat slurry via addition to de-ionized water, milling to an appropriate particle size (typically with a d50 range from 3 to 7 μm), and pH adjustment to give an appropriate viscosity for washcoating. According to methods known in the art, the washcoat slurry was coated onto the cordierite monolith (with the first layer of PdAu and the second layer of zeolite mixtures), dried at 120° C. and calcined at 500° C. to give the third layer of the multi-layer coated monolith, such that the PtPd loading was ~0.8 $g/in^3$.

The multi-layer coated monolith was canned according to methods known in the art and tested using a certified testing facility on a light-duty diesel vehicle, as described above.

EXAMPLE 2

PdAu (at 1.5 $g/in^3$) 1st Layer, Zeolite (Y=0.3 $g/in^3$) 2nd Layer, PtPd (at 0.8 $g/in^3$) 3rd Layer.

The supported PdAu catalyst powder (1.7% Pd, 2.0% Au) prepared as described above was made into a washcoat slurry via addition to de-ionized water, milling to an appropriate particle size (typically with a d50 range from 3 to 7 μm), and pH adjustment to give an appropriate viscosity for washcoating. According to methods known in the art, the washcoat slurry was coated onto a round cordierite monolith (Corning, 400 cpsi, 54.63 $in^3$), dried at 120° C. and calcined at 500° C. to give the first layer of the multi-layer coated monolith, such that the PdAu loading was ~1.5 $g/in^3$.

Then, Y zeolite was made into a washcoat slurry via addition to de-ionized water, milling to an appropriate particle size (typically with a d50 range from 3 to 7 μm), and pH adjustment to give an appropriate viscosity for washcoating. According to methods known in the art, the zeolite washcoat slurry was coated onto the cordierite monolith (with the first layer of PtPd), dried at 120° C. and calcinated at 500° C. to give the second layer of the multi-layer coated monolith. The Y zeolite washcoat loading is 0.3 $g/in^3$.

Then, the supported PtPd catalyst powder (3.0% Pt, 1.5% Pd) prepared as described above was made into a washcoat slurry via addition to de-ionized water, milling to an appropriate particle size (typically with a d50 range from 3 to 7 μm), and pH adjustment to give an appropriate viscosity for washcoating. According to methods known in the art, the washcoat slurry was coated onto the cordierite monolith (with the first layer of PdAu and the second layer of zeolite), dried at 120° C. and calcined at 500° C. to give the third layer of the multi-layer coated monolith, such that the PtPd loading was ~0.8 $g/in^3$.

The multi-layer coated monolith was canned according to methods known in the art and tested using a certified testing facility on a light-duty diesel vehicle, as described above.

EXAMPLE 3

PdAu (at 1.5 $g/in^3$) 1st Layer, Zeolite Mixture (ZSM/β=0.15/0.0.15 $g/in^3$3) 2nd Layer, PtPd (at 0.8 $g/in^3$) 3rd Layer.

The supported PdAu catalyst powder (1.7% Pd, 2.0% Au) prepared as described above was made into a washcoat slurry via addition to de-ionized water, milling to an appropriate particle size (typically with a d50 range from 3 to 7 μm), and pH adjustment to give an appropriate viscosity for washcoating. According to methods known in the art, the washcoat slurry was coated onto a round cordierite monolith (Corning, 400 cpsi, 54.63 in$^3$), dried at 120° C. and calcined at 500° C. to give the first layer of the multi-layer coated monolith, such that the PdAu loading was ~1.5 g/in$^3$.

Then, ZSM-5 zeolite and beta zeolite with a weight ratio of 1:1 were combined and made into a washcoat slurry via addition to de-ionized water, milling to an appropriate particle size (typically with a d50 range from 3 to 7 μm), and pH adjustment to give an appropriate viscosity for washcoating. According to methods known in the art, the zeolite washcoat slurry was coated onto the cordierite monolith (with the first layer of PtPd), dried at 120° C. and calcinated at 500° C. to give the second layer of the multi-layer coated monolith. Both ZSM-5 zeolite and beta zeolite washcoat loading are 0.15 g/in$^3$.

Then, the supported PtPd catalyst powder (3.0% Pt, 1.5% Pd) prepared as described above was made into a washcoat slurry via addition to de-ionized water, milling to an appropriate particle size (typically with a d50 range from 3 to 7 μm), and pH adjustment to give an appropriate viscosity for washcoating. According to methods known in the art, the washcoat slurry was coated onto the cordierite monolith (with the first layer of PdAu and the second layer of zeolite mixtures), dried at 120° C. and calcined at 500° C. to give the third layer of the multi-layer coated monolith, such that the PtPd loading was ~0.8 g/in$^3$.

The multi-layer coated monolith was canned according to methods known in the art and tested using a certified testing facility on a light-duty diesel vehicle, as described above.

EXAMPLE 4

PdAu (at 1.0 g/in$^3$) 1st Layer, Zeolite Mixture (ZSM/β/Y=0.15/0.15/0.15 g/in$^3$) 2nd Layer, PtPd (at 0.9 g/in$^3$) 3rd Layer.

The supported PdAu catalyst powder (3.0% Pd, 3.6% Au) prepared as described above was made into a washcoat slurry via addition to de-ionized water, milling to an appropriate particle size (typically with a d50 range from 3 to 7 μm), and pH adjustment to give an appropriate viscosity for washcoating. According to methods known in the art, the washcoat slurry was coated onto a round cordierite monolith (Corning, 350 cpsi, 48.16 in$^3$), dried at 120° C. and calcined at 500° C. to give the first layer of the multi-layer coated monolith, such that the PdAu loading was ~1.0 g/in$^3$.

Then, ZSM-5 zeolite, beta zeolite, and Y zeolite with a weight ratio of 1:1:1 were combined and made into a washcoat slurry via addition to de-ionized water, milling to an appropriate particle size (typically with a d50 range from 3 to 7 μm), and pH adjustment to give an appropriate viscosity for washcoating. According to methods known in the art, the zeolite washcoat slurry was coated onto the cordierite monolith (with the first layer of PtPd), dried at 120° C. and calcinated at 500° C. to give the second layer of the multi-layer coated monolith. Each zeolite washcoat loading is 0.15 g/in$^3$.

Then, the supported PtPd catalyst powder (4.0% Pt, 2.0% Pd) prepared as described above was made into a washcoat slurry via addition to de-ionized water, milling to an appropriate particle size (typically with a d50 range from 3 to 7 μm), and pH adjustment to give an appropriate viscosity for washcoating. According to methods known in the art, the washcoat slurry was coated onto the cordierite monolith (with the first layer of PdAu and the second layer of zeolite mixtures), dried at 120° C. and calcined at 500° C. to give the third layer of the multi-layer coated monolith, such that the PtPd loading was ~0.9 g/in$^3$.

The multi-layer coated monolith was canned according to methods known in the art and tested using a certified testing facility on a light-duty diesel vehicle, as described above.

EXAMPLE 5

PdAu (at 1.0 g/in$^3$) 1st Layer, Zeolite Mixture (ZSM/β=0.15/0.0.15 g/in$^3$) 2nd Layer, PtPd (at 0.9 g/in$^3$) 3rd Layer.

The supported PdAu catalyst powder (3.0% Pd, 3.6% Au) prepared as described above was made into a washcoat slurry via addition to de-ionized water, milling to an appropriate particle size (typically with a d50 range from 3 to 7 μm), and pH adjustment to give an appropriate viscosity for washcoating. According to methods known in the art, the washcoat slurry was coated onto a round cordierite monolith (Corning, 350 cpsi, 48.16 in$^3$), dried at 120° C. and calcined at 500° C. to give the first layer of the multi-layer coated monolith, such that the PdAu loading was ~1.0 g/in$^3$.

Then, ZSM-5 zeolite and beta zeolite with a weight ratio of 1:1 were combined and made into a washcoat slurry via addition to de-ionized water, milling to an appropriate particle size (typically with a d50 range from 3 to 7 μm), and pH adjustment to give an appropriate viscosity for washcoating. According to methods known in the art, the zeolite washcoat slurry was coated onto the cordierite monolith (with the first layer of PtPd), dried at 120° C. and calcinated at 500° C. to give the second layer of the multi-layer coated monolith. Both ZSM-5 zeolite and beta zeolite washcoat loading are 0.15 g/in$^3$.

Then, the supported PtPd catalyst powder (4.0% Pt, 2.0% Pd) prepared as described above was made into a washcoat slurry via addition to de-ionized water, milling to an appropriate particle size (typically with a d50 range from 3 to 7 μm), and pH adjustment to give an appropriate viscosity for washcoating. According to methods known in the art, the washcoat slurry was coated onto the cordierite monolith (with the first layer of PdAu and the second layer of zeolite mixtures), dried at 120° C. and calcined at 500° C. to give the third layer of the multi-layer coated monolith, such that the PtPd loading was ~0.9 g/in$^3$.

The multi-layer coated monolith was canned according to methods known in the art and tested using a certified testing facility on a light-duty diesel vehicle, as described above.

While particular embodiments according to the invention have been illustrated and described above, those skilled in the art understand that the invention can take a variety of forms and embodiments within the scope of the appended claims.

What is claimed is:

1. An emission control catalyst comprising a substrate having first, second, and third washcoat layers coated thereon in a multi-layer configuration, wherein the first washcoat layer includes palladium and gold particles in close contact and the third washcoat layer includes supported precious group metal particles and the second washcoat layer is between the first washcoat layer and the third washcoat layer and contains at least Y zeolite.

2. The emission control catalyst according to claim 1, wherein the second washcoat layer contains no other types of zeolite.

3. The emission control catalyst according to claim 1, wherein the second washcoat layer further contains ZSM-5 zeolite.

4. The emission control catalyst according to claim 3, wherein the weight ratio of the Y zeolite to the ZSM-5 zeolite is 2:1.

5. The emission control catalyst according to claim 3, wherein the second washcoat layer further contains beta zeolite.

6. The emission control catalyst according to claim 3, wherein equal weights of the Y zeolite, the ZSM-5 zeolite, and the beta zeolite are contained in the second washcoat layer.

7. The emission control catalyst according to claim 1, wherein the substrate has a honeycomb structure with gas flow channels, and the first, second, and third washcoat layers are coated on the walls of the gas flow channels.

8. The emission control catalyst according to claim 7, wherein the first washcoat layer is disposed directly on the walls of the gas flow channels and the third washcoat layer is disposed to be in direct contact with exhaust gases flowing through the gas flow channels.

9. The emission control catalyst according to claim 8, wherein the first washcoat layer comprises supported palladium-gold metal particles, and the second washcoat layer comprises a mixture of Y zeolite and ZSM-5 zeolite, and the third washcoat layer comprises supported platinum-palladium metal particles.

10. An emission control catalyst comprising: a substrate having first, second, and third washcoat layers coated thereon in a multi-layer configuration, wherein the first washcoat layer comprises supported palladium-gold metal particles, and the third washcoat layer comprises supported platinum-palladium metal particles, and wherein the second washcoat layer contains at least Y zeolite and is between the first washcoat layer and the third washcoat layer.

11. The emission control catalyst according to claim 10, wherein the first washcoat layer is disposed on the substrate, the second washcoat layer on the first washcoat layer, and the third washcoat layer on the second washcoat layer.

12. The emission control catalyst according to claim 10, wherein the second washcoat layer contains no other types of zeolite.

13. The emission control catalyst according to claim 12, wherein the second washcoat layer further contains ZSM-5 zeolite.

14. The emission control catalyst according to claim 13, wherein the weight ratio of the Y zeolite to the ZSM-5 zeolite is 2:1.

15. The emission control catalyst according to claim 13, wherein the second washcoat layer further contains beta zeolite.

16. The emission control catalyst according to claim 15, wherein equal weights of the Y zeolite, the ZSM-5 zeolite, and the beta zeolite are contained in the second washcoat layer.

17. The emission control catalyst according to claim 10, wherein the substrate has a honeycomb structure with gas flow channels, and the first, second, and third washcoat layers are coated on the walls of the gas flow channels.

18. The emission control catalyst according to claim 17, wherein the first washcoat layer is disposed directly on the walls of the gas flow channels and the third washcoat layer is disposed to be in direct contact with exhaust gases flowing through the gas flow channels.

19. The emission control catalyst according to claim 10, wherein the supported palladium-gold metal particles consists essentially of palladium and gold particles in close contact.

20. The emission control catalyst according to claim 1, wherein the second washcoat layer further contains beta zeolite.

21. The emission control catalyst according to claim 10, wherein the second washcoat layer further contains beta zeolite.

* * * * *